UNITED STATES PATENT OFFICE.

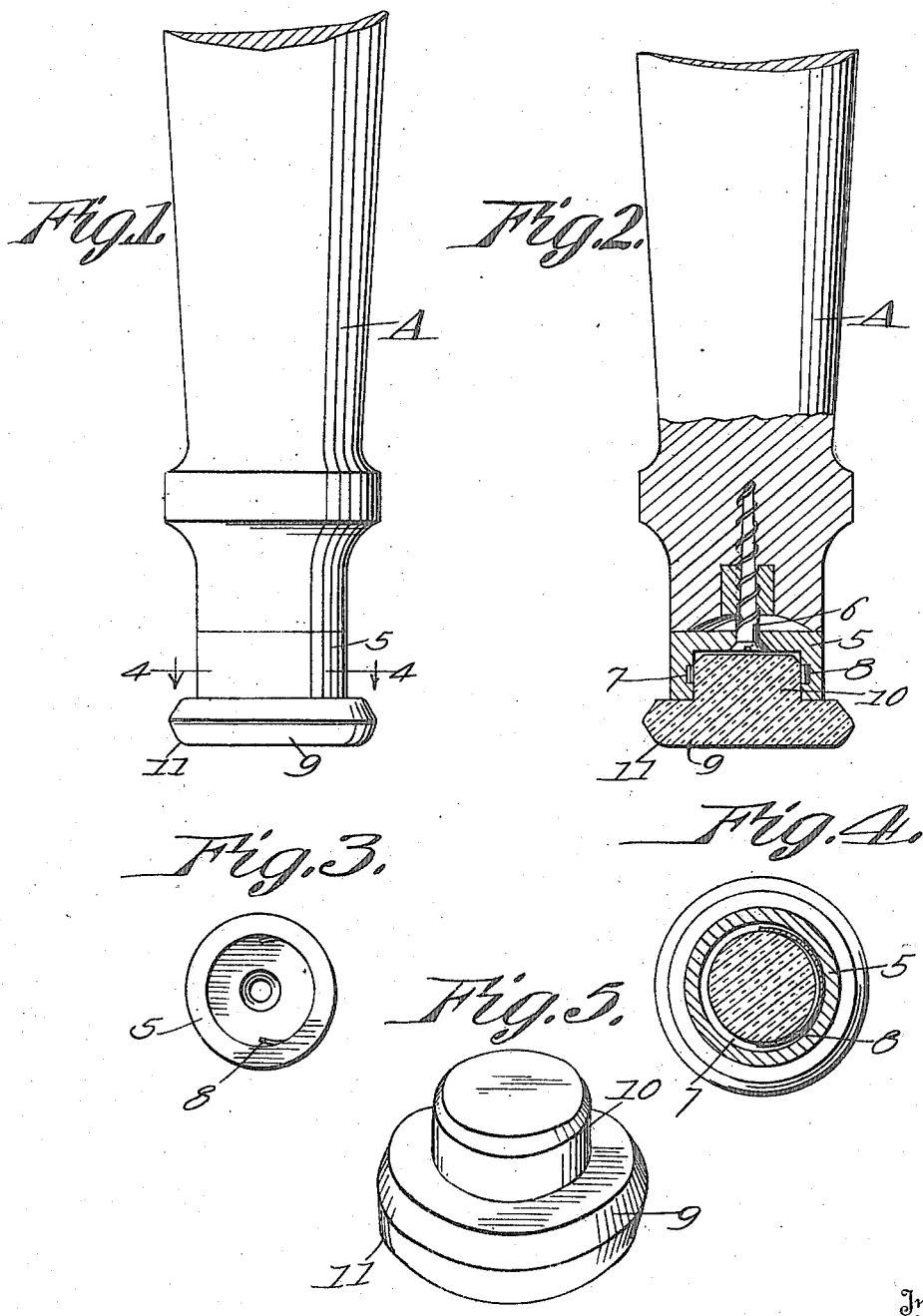

JOSEPH E. WHIDDEN, OF WHITMAN, MASSACHUSETTS.

GLIDE-CASTER.

1,263,974.  Specification of Letters Patent.  Patented Apr. 23, 1918.

Application filed July 24, 1917. Serial No. 182,536.

*To all whom it may concern:*

Be it known that JOSEPH E. WHIDDEN, a citizen of the United States, residing at Whitman, in the county of Plymouth and State of Massachusetts, have invented certain useful Improvements in Glide-Casters, of which the following is a specification, reference being had therein to the accompanying drawing.

The invention relates to a caster and more particularly to the class of glide casters.

The primary object of the invention is the provision of a caster wherein the use of a roller or wheel is entirely eliminated and thereby avoiding the marring or damage to a floor or foundation when an article of furniture is moved thereon.

Another object of the invention is the provision of a caster of this character wherein the socket member is of novel form so as to detachably receive the caster proper so as to prevent the accidental falling of the caster from the socket member when the article of furniture is moved.

A further object of the invention is the provision of a caster of this character wherein it is constructed so as to have the weight of the article of furniture uniformly distributed thereon and centrally of the same and when applied to the furniture will permit the convenient sliding thereof from one point to another without possibility of damage to the floor or foundation on which the furniture is supported.

A still further object of the invention is the provision of a caster of this character which is extremely simple in construction, thoroughly reliable and efficient in its purpose, strong, durable and inexpensive in manufacture.

With these and other objects in view the invention consists in the features of construction, combination and arrangement of parts as will be hereinafter fully described, illustrated in the accompanying drawing and pointed out in the claims hereunto appended.

In the accompanying drawing:

Figure 1 is a fragmentary elevation of a table leg showing the caster constructed in accordance with the invention applied;

Fig. 2 is a vertical longitudinal sectional view therethrough;

Fig. 3 is a plan view of the socket member of the caster;

Fig. 4 is a sectional view on the line 4—4 of Fig. 1; and

Fig. 5 is a perspective view of the caster proper removed from the socket member.

Similar reference characters indicate corresponding parts throughout the several views in the drawing.

Referring to the drawing in detail A designates a portion of the leg of an article of furniture such as a table and is shown merely to illustrate the application of the caster hereinafter fully described.

The caster comprises a socket member (5) which is preferably in the form of an inverted cup having formed centrally therein a suitable hole for receiving a screw (6) so that the socket member can be detachably fastened to the leg (A) although it is to be understood that said socket member (5) can be otherwise fastened and also is adaptable for use with various articles of furniture. Formed in the inner face of the side wall of the socket member (5) is an annular groove (7) in which is received a semi-circular shaped leaf spring (8), the ends of which protrude outwardly from within the groove (7) for frictional engagement with the caster proper hereinafter fully described.

The caster proper comprises a circular shaped or disk-like bearing head (9) from which rises centrally thereof a lug (10) which is of a diameter corresponding to the internal diameter of the socket member (5) for detachable engagement therein. The caster member is desirably made from glass although the same may be made from any other suitable material and the head (9) thereof at the outer periphery of the same is preferably rounded at (11) so as to avoid any sharp edges which would tend to damage the floor or foundation in the use of the caster upon an article of furniture.

The caster proper when engaged in the socket member (5) is free for rotation therein and the lug (10) is frictionally held engaged in the socket member through the medium of the spring (8), it being obvious that the caster proper can be readily removed from the socket member yet the accidental detachment of said caster proper from the socket member is avoided.

By reason of the particular construction of the caster proper the weight of the article is evenly distributed thereon and centrally located.

From the foregoing it is thought that the construction and manner of operation of the device will be clearly understood and therefore a more extended explanation has been omitted.

What is claimed is:

1. A caster of the character described comprising an inverted cup shaped socket member having an internal annular groove in the side thereof, a circular shaped head having a central lug rising therefrom and for detachable engagement in the socket member, and means confined within the groove in the socket member for frictionally engaging the lug to detachably hold said lug engaged in the socket member.

2. A caster of the character described comprising an inverted cup shaped socket member having an internal annular groove in the side thereof, a circular shaped head having a central upstanding lug thereon, the lug being adapted for insertion in the socket member, and a semi-circular shape leaf spring carried in the annular groove and having its ends protruding outwardly therefrom, whereby the circular shaped head and its lug are retained by friction in engagement with the socket member.

In testimony whereof I affix my signature.

JOSEPH E. WHIDDEN.

Copies of this patent may be obtained for five cents each, by addressing the "Commissioner of Patents, Washington, D. C."